United States Patent
Höglund et al.

(10) Patent No.: US 10,274,084 B2
(45) Date of Patent: Apr. 30, 2019

(54) GASKET LOCATING ARRANGEMENTS

(75) Inventors: Kasper Höglund, Rönninge (SE);
Magnus Lingvall, Huddinge (SE)

(73) Assignee: Alfa Laval Corporate AB, Lund (SE)

( * ) Notice: Subject to any disclaimer, the term of this patent is extended or adjusted under 35 U.S.C. 154(b) by 1286 days.

(21) Appl. No.: 13/504,555

(22) PCT Filed: Oct. 26, 2010

(86) PCT No.: PCT/EP2010/066178
§ 371 (c)(1),
(2), (4) Date: Jul. 10, 2012

(87) PCT Pub. No.: WO2011/051291
PCT Pub. Date: May 5, 2011

(65) Prior Publication Data
US 2012/0285670 A1 Nov. 15, 2012

(30) Foreign Application Priority Data

Oct. 30, 2009 (SE) .................................. 09174589.3

(51) Int. Cl.
*F28F 3/10* (2006.01)
*F16J 15/06* (2006.01)
*B01J 19/24* (2006.01)

(52) U.S. Cl.
CPC .......... *F16J 15/061* (2013.01); *B01J 19/249* (2013.01); *F16J 15/062* (2013.01); *F28F 3/10* (2013.01);
(Continued)

(58) Field of Classification Search
CPC ... F28F 3/025; F28F 3/10; F16J 15/061; F16J 15/062; B01J 19/249; B01J 2219/245;
(Continued)

(56) References Cited

U.S. PATENT DOCUMENTS 2,379,671 A 7/1945 Wetherby-Williams
5,486,010 A * 1/1996 Hamilton et al. ............ 277/312
(Continued)

FOREIGN PATENT DOCUMENTS

DE 650893 C 10/1937
EP 0729003 A2 8/1996
(Continued)

OTHER PUBLICATIONS

International Search Report for PCT/EP10/066178, dated Jan. 21, 2011.

*Primary Examiner* — Len Tran
*Assistant Examiner* — Hans R Weiland
(74) *Attorney, Agent, or Firm* — Murtha Cullina LLP (57) ABSTRACT

A gasket locating arrangement for a flow module, preferably plate reactor, includes a gasket, one or more locating devices, a channel in a channel plate, and a barrier plate. The gasket consists of a sheet of soft gasket material. The sheet has a cut through pattern corresponding to the channel in the channel plate. The locating devices are in the gasket, in the channel plate, in the barrier plate or combinations thereof. The locating devices are headed pins, fitting pins, protruded pins, integrated pins, dowel pins, grooves, holes, under cut recesses, thickened parts in the gasket material, and/or gasket deformation zones.

14 Claims, 7 Drawing Sheets

(52) U.S. Cl.
CPC .............. *B01J 2219/2453* (2013.01); *B01J 2219/2459* (2013.01); *B01J 2219/2462* (2013.01); *B01J 2219/2493* (2013.01)

(58) Field of Classification Search
CPC ........ B01J 2219/2453; B01J 2219/2459; B01J 2219/2462; B01J 2219/2493
USPC ........ 165/166, 167; 277/312, 598, 637, 640, 277/650, 946; 422/602, 603
See application file for complete search history.

(56) References Cited

U.S. PATENT DOCUMENTS

| | | | |
|---|---|---|---|
| 7,541,008 B2 * | 6/2009 | Chambers | ............ B01J 19/0093 422/528 |
| 2006/0233700 A1 | 10/2006 | Chellappa | |
| 2007/0081923 A1 * | 4/2007 | Choe et al. | ................... 422/129 |
| 2008/0267845 A1 * | 10/2008 | Hoglund et al. | .............. 422/224 |
| 2009/0119989 A1 | 5/2009 | Withers-Kirby et al. | |

FOREIGN PATENT DOCUMENTS

| | | |
|---|---|---|
| FR | 2618889 A1 | 2/1989 |
| GB | 2069680 A | 8/1981 |
| GB | 2078926 A | 1/1982 |
| WO | WO 2007/050013 A1 * | 5/2007 |

* cited by examiner

GASKET LOCATING ARRANGEMENTS

FIELD OF THE INVENTION

The present invention relates to a gasket locating arrangement, a use of the gasket locating arrangements in a flow module, and a flow module, preferably a plate reactor.

BACKGROUND OF THE INVENTION

Thin, planar gaskets can be used in applications where two flat surfaces are clamped together to seal off an interior chamber or flow path to an exterior space. In some applications, the gaskets are located coincident with the shape of the flat sealing surfaces. In other applications, the gaskets are located and attached to a sealing surface to allow handling during assembly. This can be a problem during assembly of complex shaped gaskets, or where the gasket is hidden during assembly, or where there are no means to locate the gasket by its edges. A restriction is that for the interference fitted dowel pins it requires enough thickness of the plate. Another restriction is that it does not easily allow for removal of the dowel pins and there will always be crevices in the interference fit for the dowel pins which are difficult to clean and spot for corrosion.

SUMMARY OF THE INVENTION

According to one aspect of the present invention, there is provided a gasket locating arrangement for a flow module, preferably plate reactor, the gasket locating arrangement comprises a gasket, locating means, a channel in a channel plate, a barrier plate, wherein the gasket constitutes of a sheet of soft gasket material, and said sheet has a cut through pattern corresponding to the channel in the channel plate. In one embodiment, the locating means are in the gasket, in the channel plate, in the barrier plate or combinations thereof, the locating means are selected from the group consisting of headed pins, fitting pins, protruded pins, integrated pins, dowel pins, grooves, holes, under cut recesses, thickened parts in the gasket material, holes in the gasket material, gasket deformation zones etc. In one embodiment, the locating means in the gasket, in the channel plate, or in the barrier plate are fitted into or to corresponding locating means in the gasket, in the channel plate, in the barrier plate or in combinations thereof leaving a flat surface together with the gasket between the channel plate and the barrier plate when the gasket locating arrangement is assembled for sealing the channel of the channel plate.

In one embodiment, the locating means for locating the gasket between the barrier plate and the channel plate are holes or pins or both holes and pins, which means locate the gasket between the barrier plate and the channel plate, and wherein heads of pins are allowed to disappear in counter sunk area of holes leaving a flat surface together with the gasket when the gasket locating arrangement is assembled. In one embodiment, the pins are located into holes in the barrier plate or into holes in the channel plate, and the pins can be located through holes in the gasket. In one embodiment, the pins are integrated in the channel plate or integrated in the barrier plate, or the pins can be integrated in both the channel plate and the barrier plate.

In one embodiment, thickened parts in the gasket material, holes in the gasket material, or deformation zones in the gasket material locate the gasket to corresponding holes, grooves or under cut recesses in the barrier plate, in the channel plate or in both channel plate and the barrier plate.

In one embodiment, the barrier plate or the channel plate has holes having countersunk areas, holes which are all-through holes, or holes which are all-through holes having countersunk areas.

The gasket comprises a sheet of soft gasket material having a cut through pattern corresponding to a channel in a channel plate. In one embodiment, the gasket has holes or other locating means, such as thickened parts, parts attached to the gasket or deformation zones, for fitting into or to corresponding fitting means in the flow module or the flow reactor. In one embodiment, the gasket is limited by a flat sealing surface of the channel plate. In one embodiment, the thickened parts are materials added to the gasket on the locating spots, and the added materials could be of the same material as the gasket and be produced at the same time as the gasket. In one embodiment, the parts attached to the gasket are of the same material as the gasket or a different material, such as for instance an expanded PTFE gasket having attached PTFE parts. In one embodiment, the deformation zones could be permanently deformable zones.

In one embodiment, the gasket is made of a material which is characterized by layers of a stochastic fibrous structure with large amount of void space. At assembly, such a gasket will first undergo a large non-recoverable deformation and if load is increased a second elastic, recoverable deformation will take place. Such a material is very soft and the shape of a gasket is highly dependent on how it is handled and located on the sealing surface. In one embodiment, the gasket is a flat sheet, or multi layer sheet of a suitable material, example of such material may be multi layer expanded polytetrafluoroethylene (ePTFE). In one embodiment, the material of the gasket is made from some other polymeric or elastomeric material such as, but not limited to, polyetheretherketone (PEEK), polypropene (PP), polytetrafluoroethylene (PTFE) etc. or Viton®, Teflon®, Kalrez® etc. Preferably the gasket material is expanded PTFE.

The cut through pattern in the gasket makes it possible for the flow of media or the flow of fluids in the channel of the channel plate to touch the barrier plate and to have no contacts with the gasket's planar faces and little or minimized contact with any of the gaskets edges. In one embodiment, the gasket has a border line shape corresponding to a border line shape of a barrier plate or a channel plate to which barrier plate and channel plate the gasket is sealing the channel. The gasket and the locating means of the gasket would provide a precise location of the gasket, even for very complex shaped gaskets, and a sealed joint between the channel plate and the barrier plate. The new and improved gasket and the locating means of the invention also solves the problem of handling the parts at assembly by securely attach the gasket to one of the sealing surfaces.

In one embodiment, the gasket is located by thickened parts, parts attached to the gasket other locating means or deformation zones in the gasket, which could be locating the gasket to corresponding holes, grooves or corresponding under cut recesses in the barrier plate or in the channel plate. Parts that are attached to the gasket are for example, but are not limited to, pins, O-rings, buttons, etc. In one embodiment, the gasket is located by pressing the gasket material into under cut recesses in the flat surfaces surrounding the gasket.

In one embodiment, the pins are loose pins which are fitted into holes, or the pins could be integrated in the channel plate or integrated in the barrier plate. The material of the loose pins is suitably selected from the group consisting of polytetrafluoroethylene (PTFE), perfluoroelastomers, fluorelastomers, polyetheretherketone (PEEK), and polypropene (PP). Integrated pins are of the same material stock as the part it is integrated in. Loose pins could have a head attaching the gasket to the sealing surface. In one embodiment, the holes in the barrier plate or in the channel plate have countersunk areas for the fitting of headed pins to allow the head to "disappear" and level flat with the gasket surface. The holes could be all-through holes according to the invention to facilitate disassembly and cleaning.

One solution, to use with an ePTFE gasket, would be for example a dowel pin with a head made of PTFE which chemically is the same material as the gasket. The gasket is located and attached by pushing pins through holes in the gasket and down into holes in the first sealing surface with a light interference fit. The second mating sealing surface has no holes and maybe totally flat. It pushes directly on the head of the dowel pin which are further pushed down as the gasket compresses. To remove the pins, for example the dowel pins, it is convenient with all-through holes, it is then possible to push the pins out from the back. Thus, one alternative would be to use counter sunk head dowel pins of a suitable material.

In another embodiment, integrated dowel pins are employed. This solution makes the gasket both easy to locate and easy to attach. Dowel pins may be integrated on the first sealing surface. By doing the dowel pins of the same piece of material as the sealing surface the problem of drilling depth and crevices is eliminated. In one embodiment, the holes in the gasket are with an interference fit to attach the gasket securely. The mating second sealing surface has holes with a clearance fit.

Yet another alternative would be to flatten down the gasket in recesses in the sealing surface. By this procedure the gasket is located and attached by permanent deformation, and the gasket sticks to the first sealing surface. This is done by under cut recesses in the surface where the gasket is pushed and flattened down. The mating second sealing surface has no holes and maybe totally flat.

The present invention relates further to use of gasket locating arrangements for sealing a channel in a plate reactor or in a plate flow module to make it possible for the flow of media or the flow of fluids in the channel of the channel plate to touch the barrier plate and to have no contacts with the gasket's planar faces and little or minimized contact with any of the gaskets edges.

The present invention relates further to a flow module, preferably a plate reactor, comprising one or more gasket locating arrangements according to the invention, and one or more heat transfer means for heat transfer to and from the channel, and wherein each channel plate has one or more inlets, preferably two inlets, to the channel, and one outlet from the channel. The channel plate can have one or more port holes, the port holes makes it possible to access the channel. The heat transfer mean can comprise a utility plate and a barrier plate, between the utility plate and the barrier plate may a turbulator insert be inserted for enhancing the heat transfer to and from the channel of the channel plates.

In the following will the invention be explained by the use of FIGS. 1 to 13. The figures are for the purpose of demonstrating the invention and are not intended to limit its scope.

DETAILED DESCRIPTION

Figure 1:
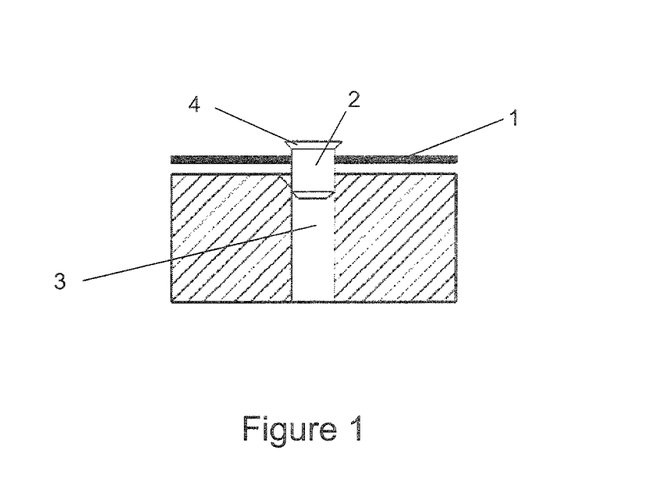
FIG. 1 shows one embodiment of the present invention wherein a headed dowel pin is located in a hole.
Figure 2:
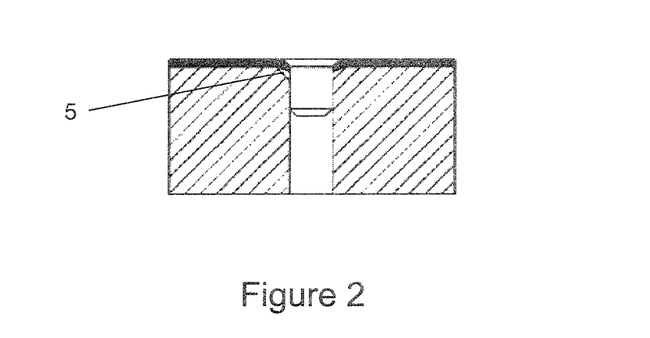
FIG. 2 shows one embodiment of the present invention wherein a headed dowel pin is located in a hole.
Figure 3:
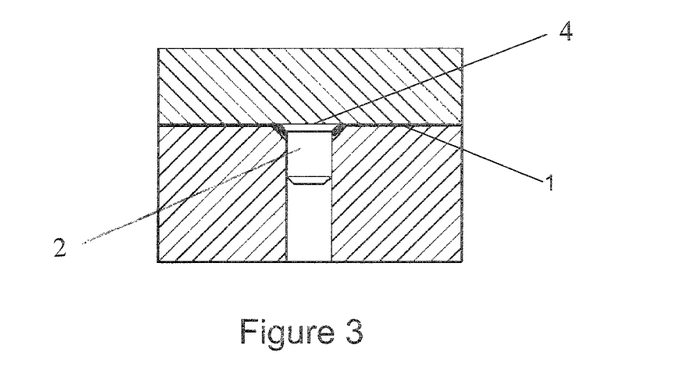
FIG. 3 shows one embodiment of the present invention wherein a headed dowel pin is located in a hole.

FIG. 1 illustrates a gasket 1 located with a pin 2 on to all-through hole 3. In this figure the pin is a headed pin or a headed dowel pin. The head 4 is fitted into countersunk area 5, see FIG. 2. Since the hole of the gasket is fitting pin 2, then the gasket material will follow the pin down into countersunk area 5. This solution does locate and attach the gasket to one of the surfaces during assembly. All-through hole 3 have a countersunk area for the head of pin 2, thus the head "disappears" in the surface, which surface should still remain flat. All-through hole 3 allows easy removal of pins 2 when disassembling the reactor or flow module. Another advantage of all-through holes is that the holes will be easily cleaned. FIG. 3 also illustrates that the gasket 1 has been compressed when the reactor or the flow module is assembled, and the thickness is less than that of an unused gasket.

Figure 4:
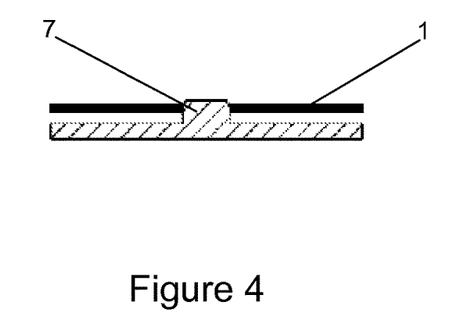
FIG. 4 shows another embodiment of the present invention wherein a protruding pin is locating the gasket.
Figure 5:
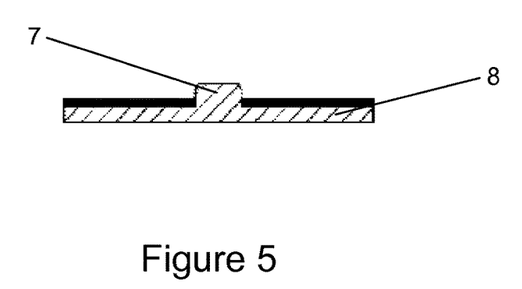
FIG. 5 shows another embodiment of the present invention wherein a protruding pin is locating the gasket.
Figure 6:
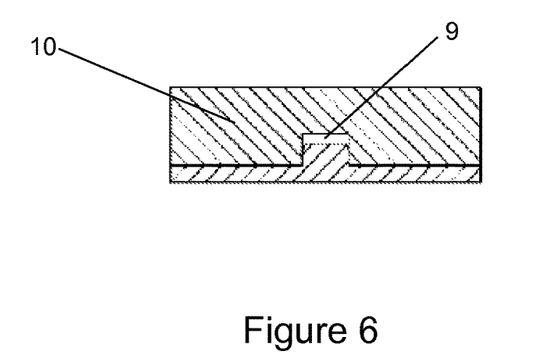
FIG. 6 shows another embodiment of the present invention wherein a protruding pin is locating the gasket.

FIG. 4 shows how the gasket 1 is located onto protruded pin 7 or onto integrated pin 7, and FIG. 5 shows how the gasket 1 is fitted on a plate 8 and the pin 7. The holes in gasket 1 may have an interference fit to attach gasket 1 to plate 8. Hole 9 in mating plate 10 has to have a clearance fit to allow assembly.

Figure 7:
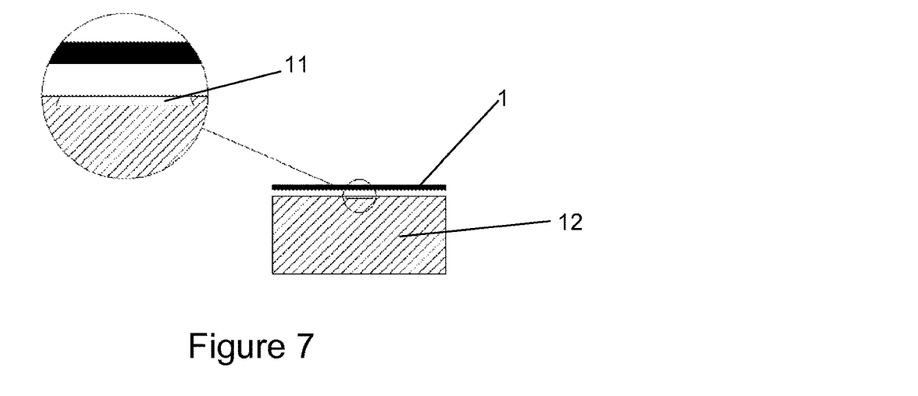
FIG. 7 shows yet another embodiment of the present invention wherein the gasket is pressed into a recess.
Figure 8:
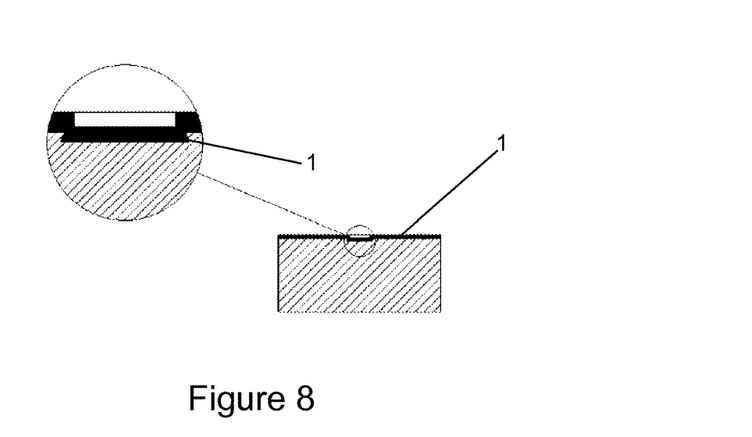
FIG. 8 shows yet another embodiment of the present invention wherein the gasket is pressed into a recess.
Figure 9:
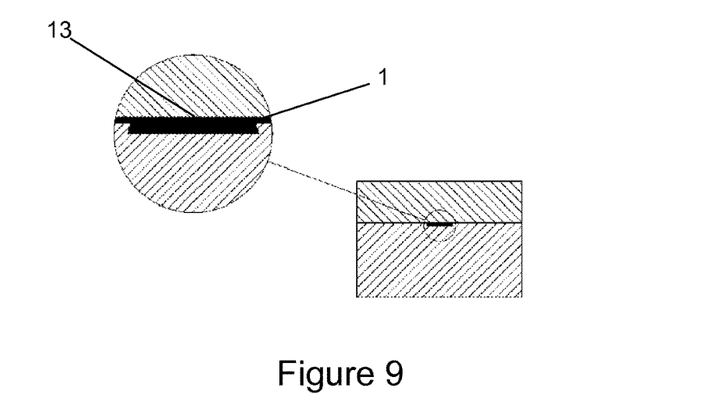
FIG. 9 shows yet another embodiment of the present invention wherein the gasket is pressed into a recess.

FIG. 7 shows the gasket 1 before it is pressed into under cut recess 11 in plate 12. The gasket 1 is pressed into under cut recess 11 in FIG. 8. The gasket 1 is equipped with other locating means such as, but not limited to, thickened parts or parts attached to the gasket that fits in recesses. In FIG. 9, the gasket 1 is compressed when the reactor or flow module is assembled. The gasket 1 is located and attached by permanent deformation, and gasket 1 sticks to the first sealing surface. This is done by under cut recesses in the surface where the gasket is pushed and flattened down. Mating second sealing surface 13 has no holes and maybe totally flat.

Figure 10:
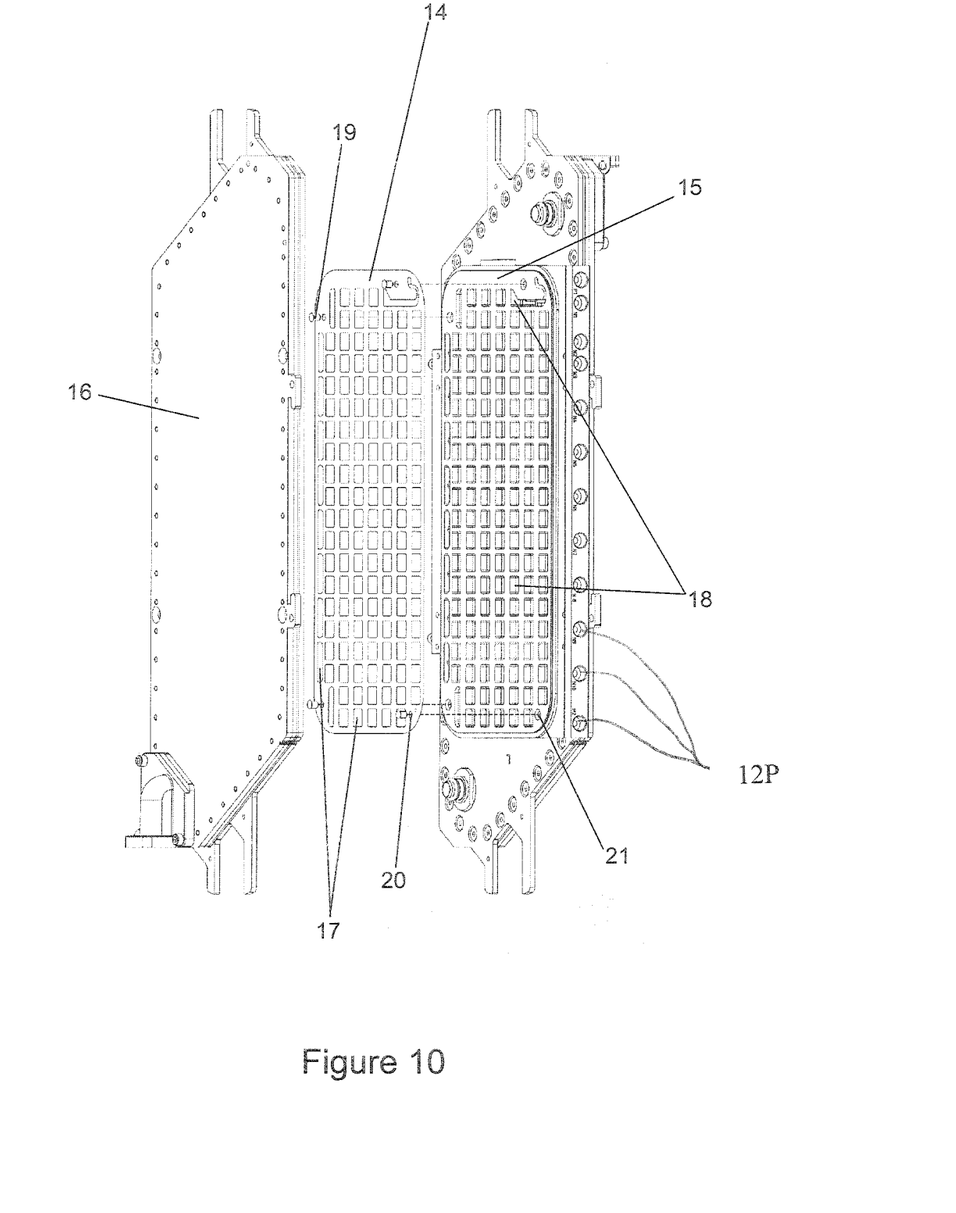
FIG. 10 shows how a gasket is placed between a channel plate and a barrier plate according to the invention.

FIG. 10 shows how the gasket 14 is located between channel plate 15 and barrier plate 16 or placed between channel plate 15 and heat exchanger plate 16 according to the invention. The gasket 14 has cut-through areas 17 corresponding to channel 18 of channel plate 15. Pins 19 locate gasket 14 onto channel plate 15 through holes 20 in the gasket 14 and into holes 21 in the channel plate 15. The pins 19 could be any type of pins, in this figure headed dowel pins are shown, and the pins 19 are fitted into holes 21 having countersunk areas and the holes are all-through holes in this figure. In one embodiment, the holes 21 are of other types according to the invention. The channel plate 15 includes a plurality of port holes 12P providing access to the channel 18.

Figure 11:
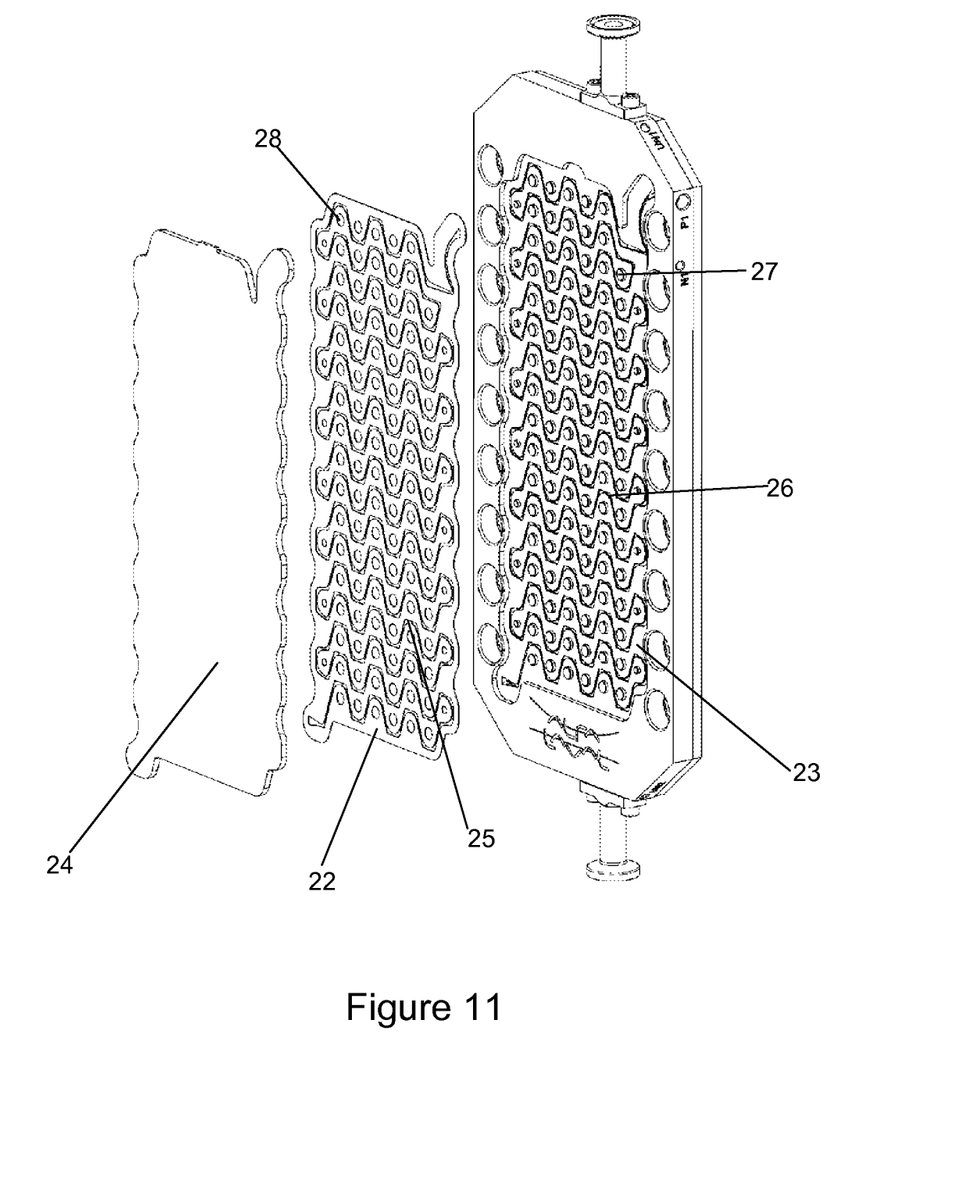
FIG. 11 shows how a gasket is placed between another channel plate and a barrier plate according to another embodiment of the invention.
Figure 12:
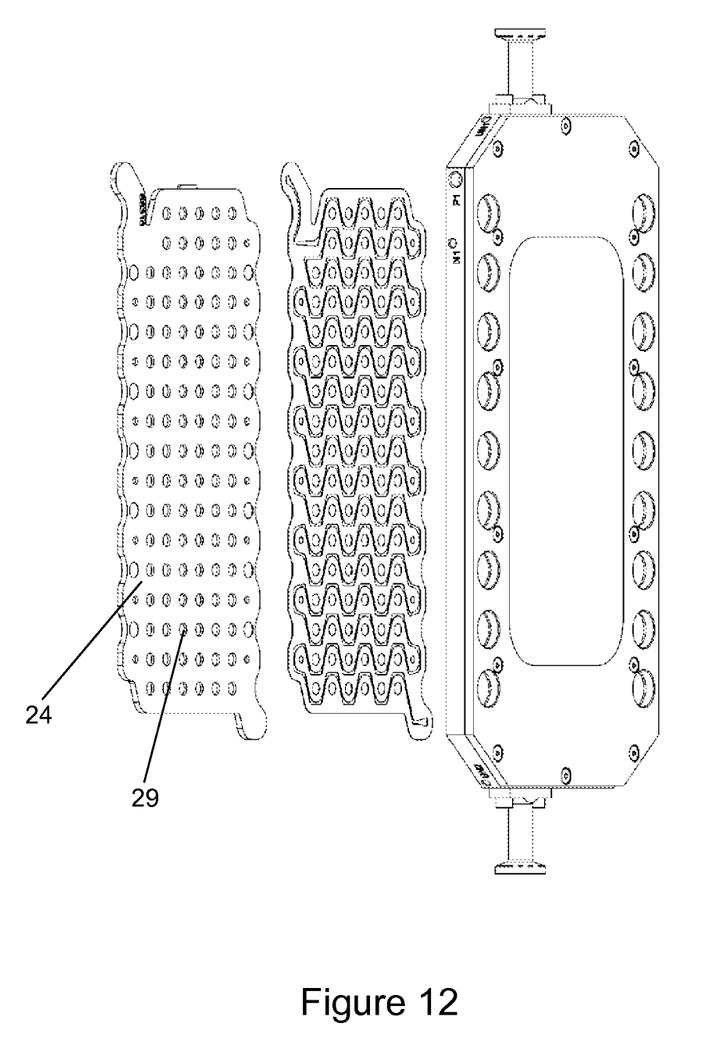
FIG. 12 shows how a gasket is placed between another channel plate barrier plate according to another embodiment of the invention.

FIGS. 11 and 12 show how gasket 22 is located between channel plate 23 and bather plate 24, according to another embodiment of the invention. The gasket 22 has cut-through area 25 corresponding to channel 26 of channel plate 23. Integrated pins 27 in the channel plate 23 locate the gasket 22 through holes 28 in the gasket on to channel plate 23. The pins 27 are mated into holes 29 in the barrier plate 24, see FIG. 12.

Figure 13:
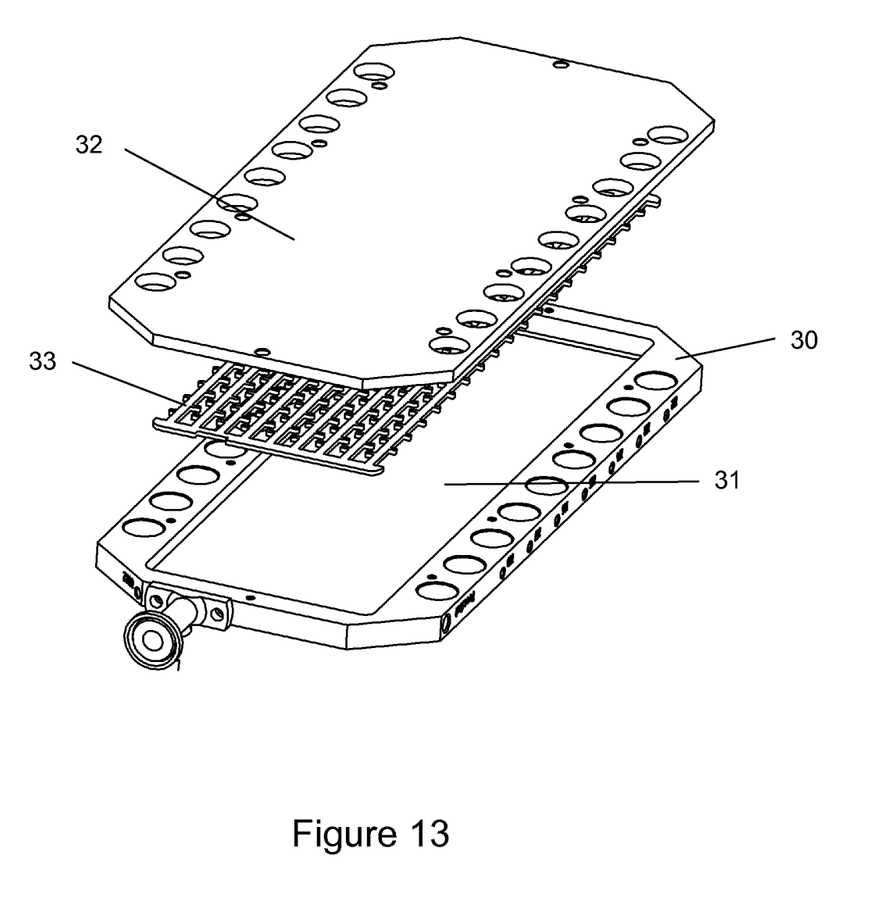
FIG. 13 shows a turbulator insert to be placed in a utility plate according to one embodiment of the present invention.

FIG. 13 shows a means for heat transfer in a flow module, preferably in a plate reactor, according to one embodiment of the invention. The heat transfer means comprises two parts, one part is a utility plate 30 having a compartment 31, and the second part is a barrier plate 32. For the purpose of enhancing the heat transfer to and from a channel in a channel plate, the channel plate is not seen in FIG. 13, can a turbulator insert 33 be inserted between utility plate 30 and barrier plate 32. Turbulator insert 33 can be inserted into any type of heat transfer means which could harbour a turbulator insert. The heat transfer means according to the invention is, for example, of any kind and the heat transfer means shown in FIG. 13 is one example of possible heat transfer means.

The invention claimed is:

1. A gasket locating arrangement for a flow module, preferably plate reactor, comprising:
   a gasket,
   locating means,
   a channel in a channel plate,
   a barrier plate,
   wherein the gasket consists of a sheet of soft gasket material, and said sheet has a cut through pattern corresponding to the channel in the channel plate,
   the locating means are in the gasket, in the channel plate, in the barrier plate or combinations thereof, which locating means are selected from the group consisting of headed pins, fitting pins, protruded pins, integrated pins, dowel pins, grooves, holes, under cut recesses, thickened parts in the gasket material, gasket deformation zones, wherein the locating means in the gasket, in the channel plate, or in the barrier plate are fitted into or to corresponding locating means in the gasket, in the channel plate, in the barrier plate or in combinations thereof leaving a flat surface together with the gasket between the channel plate and the barrier plate when the gasket locating arrangement is assembled for sealing the channel of the channel plate, and that the cut through pattern in the gasket makes it possible for the flow of media or the flow of fluids in the channel of the channel plate to touch the barrier plate and to have no contacts with the gasket's planar faces and little or minimized contact with any of the gaskets edges.

2. The gasket locating arrangement according to claim 1, comprising the locating means for locating the gasket between the barrier plate and the channel plate are holes or pins or both holes and pins, the means locate the gasket between the barrier plate and the channel plate, and wherein heads of pins are allowed to disappear in counter sunk area of holes leaving a flat surface together with the gasket when the gasket locating arrangement is assembled.

3. The gasket locating arrangements according to claim 1, wherein the pins are located into holes in the barrier plate or into holes in the channel plate, and the pins are located through holes in the gasket.

4. The gasket locating arrangements according to claim 1, wherein the pins are integrated in the channel plate or integrated in the barrier plate, or the pins are integrated in both the channel plate and the barrier plate.

5. The gasket locating arrangements according to claim 1, wherein thickened parts in the gasket material, holes in the gasket material, or deformation zones in the gasket material locate the gasket to corresponding holes, grooves or under cut recesses in the barrier plate, in the channel plate or in both channel plate and the barrier plate.

6. The gasket locating arrangements according to claim 1, wherein the holes have countersunk areas, the holes are all-through holes, or the holes are all-through holes having countersunk areas.

7. The gasket locating arrangements according to claim 1, wherein the soft gasket material is selected from the group of materials consisting of multi layer expanded polytetrafluoroethylene (ePTFE), polytetrafluoroethylene (PTFE), perfluorelastomers, fluorelastomers, polyetheretherketone (PEEK), and polypropene (PP).

8. The gasket locating arrangements according to claim 1, wherein the soft gasket material is expanded polytetrafluoroethylene (ePTFE) having layers of a stochastic fibrous structure and large amount of void space the material undergoes a nonrecoverable deformation under assembly compression.

9. The gasket locating arrangements according to claim 1, wherein the pins are made of a material selected from the group consisting of polytetrafluoroethylene (PTFE), perfluorelastomers, fluorelastomers, polyetheretherketone (PEEK), and polypropene (PP).

10. A method of using gasket locating arrangements, the method comprising:
    providing a gasket locating arrangement comprising:
    a gasket,
    locating means,
    a channel in a channel plate,
    a barrier plate,
    wherein the gasket consists of a sheet of soft gasket material, and said sheet has a cut through pattern corresponding to the channel in the channel plate,
    the locating means are in the gasket, in the channel plate, in the barrier plate or combinations thereof, which locating means are selected from the group consisting of headed pins, fitting pins, protruded pins, integrated pins, dowel pins, grooves, holes, under cut recesses, thickened parts in the gasket material, gasket deformation zones, wherein the locating means in the gasket, in the channel plate, or in the barrier plate are fitted into or to corresponding locating means in the gasket, in the channel plate, in the barrier plate or in combinations thereof leaving a flat surface together with the gasket between the channel plate and the barrier plate when the gasket locating arrangement is assembled for sealing the channel of the channel plate, and that the cut through pattern in the gasket makes it possible for the flow of media or the flow of fluids in the channel of the channel plate to touch the barrier plate and to have no contacts with the gasket's planar faces and little or minimized contact with any of the gaskets edges; and sealing a channel in a plate reactor or plate flow module with the gasket locating arrangement.

11. A flow module comprising:

at least one gasket locating arrangement comprising:
 a gasket,
 locating means,
 a channel in a channel plate,
 a barrier plate,
 wherein the gasket consists of a sheet of soft gasket material, and said sheet has a cut through pattern corresponding to the channel in the channel plate,
 the locating means are in the gasket, in the channel plate, in the barrier plate or combinations thereof, which locating means are selected from the group consisting of headed pins, fitting pins, protruded pins, integrated pins, dowel pins, grooves, holes, under cut recesses, thickened parts in the gasket material, gasket deformation zones, wherein the locating means in the gasket, in the channel plate, or in the barrier plate are fitted into or to corresponding locating means in the gasket, in the channel plate, in the barrier plate or in combinations thereof leaving a flat surface together with the gasket between the channel plate and the barrier plate when the gasket locating arrangement is assembled for sealing the channel of the channel plate, and that the cut through pattern in the gasket makes it possible for the flow of media or the flow of fluids in the channel of the channel plate to touch the barrier plate and to have no contacts with the gasket's planar faces and little or minimized contact with any of the gaskets edges;
 one or more heat transfer devices for heat transfer to and from the channel, and wherein each channel plate has at least one inlet to the channel, and one outlet from the channel.

12. A flow module according to claim 11, wherein the channel plate has one or more port holes, which port holes makes it possible to access the channel.

13. A flow module according to claim 11, wherein the one or more heat transfer devices comprises a utility plate and a barrier plate, between the utility plate and the barrier plate is a turbulator insert inserted for enhancing the heat transfer to and from the channel of the channel plates.

14. A flow module of claim 11, wherein the flow module comprises a plate reactor.

\* \* \* \* \*